US012790189B2

(12) United States Patent
Maillault et al.

(10) Patent No.: US 12,790,189 B2
(45) Date of Patent: Nov. 10, 2026

(54) STEERING CONTROL SYSTEM FOR ROLLING WORK VEHICLE

(71) Applicant: MANITOU BF, Ancenis (FR)

(72) Inventors: Fabien Maillault, Ancenis (FR); Valentin Brehier, Ancenis (FR); David Marais, Ancenis (FR)

(73) Assignee: MANITOU BF, Ancenis (FR)

( * ) Notice: Subject to any disclaimer, the term of this patent is extended or adjusted under 35 U.S.C. 154(b) by 275 days.

(21) Appl. No.: 18/729,812

(22) PCT Filed: Jan. 20, 2023

(86) PCT No.: PCT/EP2023/051439
§ 371 (c)(1),
(2) Date: Feb. 18, 2025

(87) PCT Pub. No.: WO2023/139236
PCT Pub. Date: Jul. 27, 2023

(65) Prior Publication Data

US 2025/0178875 A1 Jun. 5, 2025

(30) Foreign Application Priority Data

Jan. 21, 2022 (FR) ...................................... 2200508

(51) Int. Cl.
*B66F 9/075* (2006.01)
*B66F 9/065* (2006.01)
*B66F 9/24* (2006.01)

(52) U.S. Cl.
CPC ........ *B66F 9/07568* (2013.01); *B66F 9/0655* (2013.01); *B66F 9/24* (2013.01)

(58) Field of Classification Search
CPC ...... B66F 9/0655; B66F 9/07568; B66F 9/24; B66F 17/003
See application file for complete search history.

(56) References Cited

U.S. PATENT DOCUMENTS

2006/0047391 A1* 3/2006 Katou .................... B62D 6/008 180/443
2006/0180381 A1* 8/2006 Sonderegger ......... B66F 9/0655 180/282

(Continued)

FOREIGN PATENT DOCUMENTS

WO 2017055774 A1 4/2017

OTHER PUBLICATIONS

International Search Report and Written Opinion for International Patent Application No. PCT/EP2023/051439, mailed Feb. 21, 2023, 12 pages.

*Primary Examiner* — Blake A Wood
(74) *Attorney, Agent, or Firm* — Husch Blackwell LLP

(57) ABSTRACT

The disclosure relates to a work vehicle comprising a lifting arm and a steering control system. The steering control system is configured to receive a turning request signal and an orientation parameter of the lifting arm and to generate a turning setpoint signal representative of a turning angle of the steering wheels and intended to drive a turning actuator. The steering control system comprises a filtering module configured to determine a first rate-of-variation cap as a function of the orientation parameter of the lifting arm and to generate the turning setpoint signal as a function of the turning request signal such that a rate of variation of the turning setpoint signal does not exceed the first rate-of-variation cap.

20 Claims, 6 Drawing Sheets

(56) References Cited

U.S. PATENT DOCUMENTS

| | | | | |
|---|---|---|---|---|
| 2011/0224872 | A1* | 9/2011 | Reed | B62D 6/002<br>701/41 |
| 2014/0121840 | A1* | 5/2014 | Mizuochi | G06F 30/15<br>700/275 |
| 2015/0090507 | A1* | 4/2015 | Okada | B66F 9/07568<br>701/50 |
| 2016/0251835 | A1* | 9/2016 | Kitajima | E02F 3/3663<br>701/50 |
| 2018/0201156 | A1* | 7/2018 | Mangette | B60W 30/18172 |
| 2018/0215411 | A1* | 8/2018 | Riot | B66F 9/07568 |
| 2019/0061813 | A1* | 2/2019 | Riot | B66F 9/07568 |

* cited by examiner

STEERING CONTROL SYSTEM FOR ROLLING WORK VEHICLE

TECHNICAL FIELD

The disclosure relates to the field of rolling work vehicles comprising at least two steering wheels and a lifting arm and a steering control system. In particular, the disclosure relates to a load handling vehicle such as a power lift truck with telescopic arm.

BACKGROUND

Work vehicles, in particular load handling vehicles, are generally equipped with a steering wheel allowing an operator to control a wheel turning movement.

However, the turning of the wheels can affect the stability of the vehicle, in particular the lateral stability. An excessively fast turning of the wheels can culminate in the overturning of the vehicle. A turning movement can thus prove dangerous or not, depending on factors likely to affect the stability of the vehicle, such as, for example, a speed of movement of the vehicle and a position of the lifting arm. These are therefore factors to be taken into account for carrying out wheel turning movements.

US20060180381 A1 describes a container-handling vehicle comprising a computation unit configured to determine limitations of the turning movements as a function of different operational parameters.

SUMMARY

One idea on which the disclosure is based is to propose a steering control system which preserves the stability of a work vehicle in various operating conditions, in particular during load handling operations, and which allows an operator to control the steering of the vehicle according to his or her needs.

For that, according to one embodiment, the disclosure provides a rolling work vehicle comprising:

a main body, a lifting arm mounted to be movable on the main body and intended to handle loads, a sensor configured to detect a lifting arm orientation parameter, a steering axle including at least two steering wheels, a turning actuator coupled to the steering wheels to modify a turning angle of the steering wheels, a steering control member that can be actuated by an operator to produce a turning request signal, and a steering control system configured to receive the turning request signal and the lifting arm orientation parameter and to generate a turning setpoint signal representative of a turning angle of the steering wheels and intended to drive the turning actuator, the steering control system comprising a filtering module configured to:

determine a first rate-of-variation cap as a function of the lifting arm orientation parameter, generate the turning setpoint signal as a function of the turning request signal such that a rate of variation of the turning setpoint signal does not exceed the first rate-of-variation cap.

By virtue of these features, the first rate-of-variation cap makes it possible to allow a more or less rapid turning movement as a function of an orientation of the lifting arm. A rate of variation of an angle of the steering wheels can thus be limited as a function of the lifting arm orientation parameter, in order to ensure a totally safe turning of the wheels.

According to embodiments, such a work vehicle can comprise one or more of the following features.

According to one embodiment, the lifting arm orientation parameter comprises an angle of the lifting arm.

According to one embodiment, the angle of the lifting arm is measured with respect to a reference frame chosen from among the main body and the Earth's reference frame.

The lifting arm orientation parameter can relate to one or more degrees of freedom of the lifting arm, for example a degree of freedom in elevation about a horizontal axis and/or a degree of freedom in orientation about a vertical axis. According to a preferred embodiment, the angle of the lifting arm is an elevation angle about a horizontal axis.

According to one embodiment, the first rate-of-variation cap decreases when the elevation angle of the lifting arm increases.

According to one embodiment, the filtering module is further configured to:

determine a direction of variation of the turning request signal out of a direction of turn and a reverse direction, determine the first rate-of-variation cap as first value of the cap when the direction of variation is the direction of turn is as second cap value when the direction of variation is the reverse direction, the second cap value being higher than the first cap value.

According to one embodiment, the filtering module is configured to:

determine a minimum rate of variation out of a rate of variation of the turning request signal and the first rate-of-variation cap, generate the turning setpoint signal such that the rate of variation of the turning setpoint signal corresponds to the minimum rate of variation.

According to one embodiment, the work vehicle comprises a sensor for detecting a speed of movement of the vehicle. According to said embodiment, the filtering module is further configured to:

determine a second rate-of-variation cap as a function of the speed of movement of the vehicle, generate the turning setpoint signal as a function of the turning request signal such that a rate of variation of the turning setpoint signal does not exceed the second rate-of-variation cap.

According to one embodiment, the second rate-of-variation cap decreases when the speed of movement increases.

According to one embodiment, the filtering module is further configured to:

determine a direction of variation of the turning request signal out of a direction of turn and a reverse direction, determine the second rate-of-variation cap as third cap value when the direction of variation is the direction of turn and as fourth variation value when the direction of variation is the reverse direction, the fourth cap value being higher than the third cap value.

According to one embodiment, the filtering module is configured to:

determine a minimum rate of variation out of a rate of variation of the turning request signal, the first rate-of-variation cap and the second rate-of-variation cap, generate the turning setpoint signal such that the rate of variation of the turning setpoint signal corresponds to the minimum rate of variation.

According to one embodiment, the work vehicle comprises a sensor for detecting a speed of movement of the vehicle. According to said embodiment, the steering control system comprises a renormalization module configured to:

receive the turning request signal from the steering control member, determine a multiplying renormalization coefficient as a function of the speed of movement of the vehicle, generate a re-normalized turning request signal as a function of the turning request signal and of the renormalization coefficient, supply the re-normalized turning request signal to the filtering module.

According to one embodiment, the multiplying renormalization coefficient decreases when the speed of movement increases.

According to one embodiment, the multiplying renormalization coefficient reaches a plateau from a threshold speed of the vehicle.

According to one embodiment, the threshold speed is a parameter that can be configured using a user interface. For example, the threshold speed is 20 kilometres per hour.

According to one embodiment, the values of the renormalization coefficient, notably the value of the plateau, can be configured using a user interface. For example, the value of the plateau is 25%.

According to one embodiment, the steering control system comprises a correction module configured to:

receive the turning request signal from the steering control member, generate a turning request signal corrected by application of a gain function to the position signal, the gain function being a convex function.

According to one embodiment, the work vehicle comprises a sensor for detecting a speed of movement of the vehicle. According to said embodiment, the steering control system comprises a conversion module configured to:

determine a turning angle cap as a function of the speed of movement of the vehicle, wherein the turning angle cap decreases when the speed of movement increases, generate the turning setpoint signal, by application of a capping law to said turning request signal, such that the turning setpoint signal represents a turning angle value less than or equal to the turning angle cap.

According to a preferred embodiment, the steering control system comprises a proportional integral derivative (PID) corrector.

According to one embodiment, the steering control system can be implemented in a distributed manner.

The steering control member can have various forms, for example a lever, a steering wheel, buttons, a touchscreen, etc. According to a preferred embodiment, the steering control member is a steering joystick that can be actuated by a hand or by a finger of the operator. A steering member such as a steering joystick allows the operator to control the turning movement of the wheels without effectuating any movement of great amplitude.

The steering joystick does not offer a displacement amplitude that is as wide as the steering wheel, which can raise issues linked to the accuracy of the control exerted by the operator. However, the control system, in particular the filtering module, can be configured to avoid an excessively abrupt movement of the steering joystick from being fully transmitted to the steering actuator. Thus, the steering control system is advantageous both for the ergonomics offered to the operator and for the safety of operation obtained.

According to one embodiment, the work vehicle comprises two steering axles including at least four steering wheels. According to said embodiment, the turning actuator is coupled to the four steering wheels to modify a turning angle of the four steering wheels.

According to one embodiment, the disclosure also provides a control method for controlling a turning actuator in a rolling work vehicle, the work vehicle comprising a main body, a lifting arm mounted to be movable on the main body and intended to handle loads, a steering axle including at least two steering wheels and said turning actuator coupled to the steering wheels to modify a turning angle of the steering wheels, the method comprising: receiving a turning request signal from a steering control member that can be actuated by an operator, receiving a lifting arm orientation parameter, determining a first rate-of-variation cap as a function of a lifting arm orientation parameter, generating a turning setpoint signal representative of a turning angle of the steering wheels as a function of the turning request signal such that a rate of variation of the turning setpoint signal does not exceed the first rate-of-variation cap, driving the turning actuator as a function of the turning setpoint signal.

Such a method can be implemented by a unitary or distributed steering control system. The disclosure also provides a steering control system configured to implement this method.

BRIEF DESCRIPTION OF THE DRAWINGS

The disclosure will be better understood, and other aims, details, features and advantages thereof will become more clearly apparent from the following description of several particular embodiments of the disclosure, given in a purely illustrative and nonlimiting manner, with reference to the attached drawings.

DESCRIPTION

Figure 1:
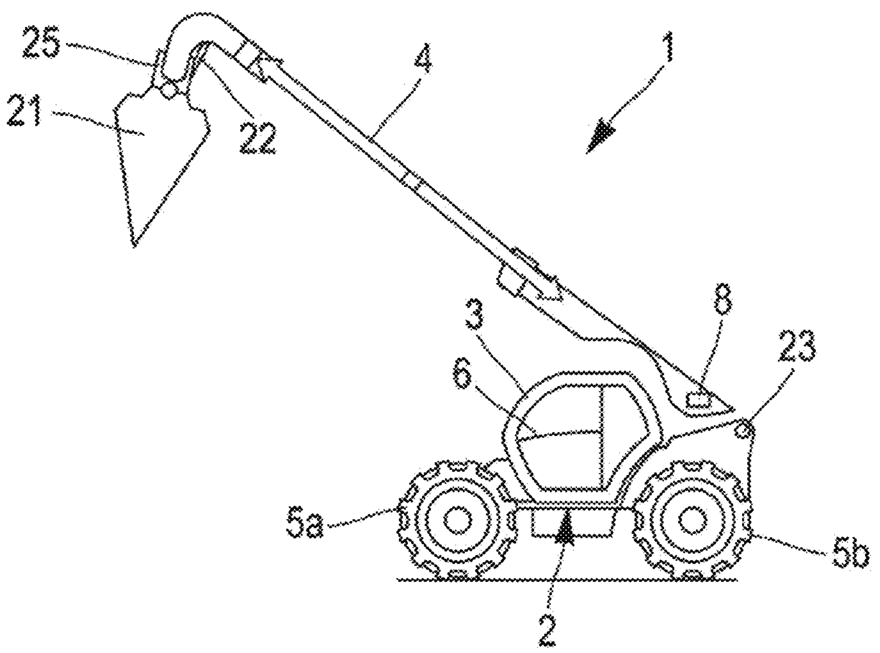
FIG. 1 is a side schematic view of a rolling work vehicle in the form of a power lift truck with telescopic arm to which is articulated a lifting arm according to an embodiment.

FIG. 1 represents a work vehicle 1 in the form of a load handling truck with telescopic arm comprising a main body 2 mounted to roll on a front axle comprising two front wheels Sa and a rear axle comprising two rear wheels 5*b*. A lifting arm 4, represented here in lifted position, is mounted to pivot about a horizontal axis 23 arranged to the rear of the main body 2. The main body 2 is topped by a driving cabin 3 inside which an operator can sit to drive the work vehicle 1 and control the actuation of the lifting arm 4.

The lifting arm 4 can be a telescopic arm of a length that is adjustable between a retracted position and an extended position. The lifting arm makes it possible to bear loads. A degree of freedom in rotation between the main body 2 and the lifting arm 4 makes it possible to lift or lower the lifting arm by means of a lifting cylinder which is not represented. A tool 21 can be fixed to a tool-holder 25 of the lifting arm. According to a preferred embodiment, the tool-holder 25 can be designed to removably mount various handling tools such as forks, a boom, a bucket or the like. An excavation cylinder 22 makes it possible to orient the tool 21 with respect to the lifting arm 4. A telescoping cylinder not represented makes it possible to adjust the length of the telescopic arm.

The work vehicle 1 comprises at least one steering axle, for example the front axle or the rear axle. In a variant, both of the axles are steering axles, namely four steering wheels. The driving of the work vehicle 1 in displacement is made possible by the rotating of wheels 5 in contact with the ground by means of a traction system which will not be described in detail. The motorization can be heat engine-based or electrical. The transmission can be mechanical or hydraulic.

Referring to FIGS. 2 to 11, the structure and the operation of a steering control system embedded in the work vehicle 1 to allow an operator to control the turning movements of the steering wheels will be described.

The operator can control the turning movements of the wheels 5*a* and 5*b* using a steering joystick 6 situated in the cabin 3, for example on an armrest 32 of an operator seat 31. The steering joystick sends a position signal A to a steering control system 10.

The control system 10 generates a wheel position signal E which is transmitted to a turning actuator 12 coupled to the steering wheels to modify a turning angle of the steering wheels and thus modify a direction of displacement of the vehicle 1. The turning angle is for example identical for all the steering wheels. The turning actuator 12 is for example hydraulic or electrical. A hydraulic distribution system 11 is used to drive the turning actuator 12 in the case where the turning actuator 12 is hydraulic.

A speed-of-movement sensor 7 is disposed on the work vehicle 1 and transmits a speed of movement of the vehicle v to the steering control system 10.

An elevation angle sensor 8 is disposed on the lifting arm 4 and transmits a lifting angle value x of the lifting arm 4, measured between a plane of the main body 2 and the lifting arm 4, to the steering control system 10.

At least one sensor 8 of elevation angle x of the lifting arm 4 is disposed on the lifting arm 4 and transmits a value of said lifting arm orientation parameter x to the control system 10.

Figure 2:
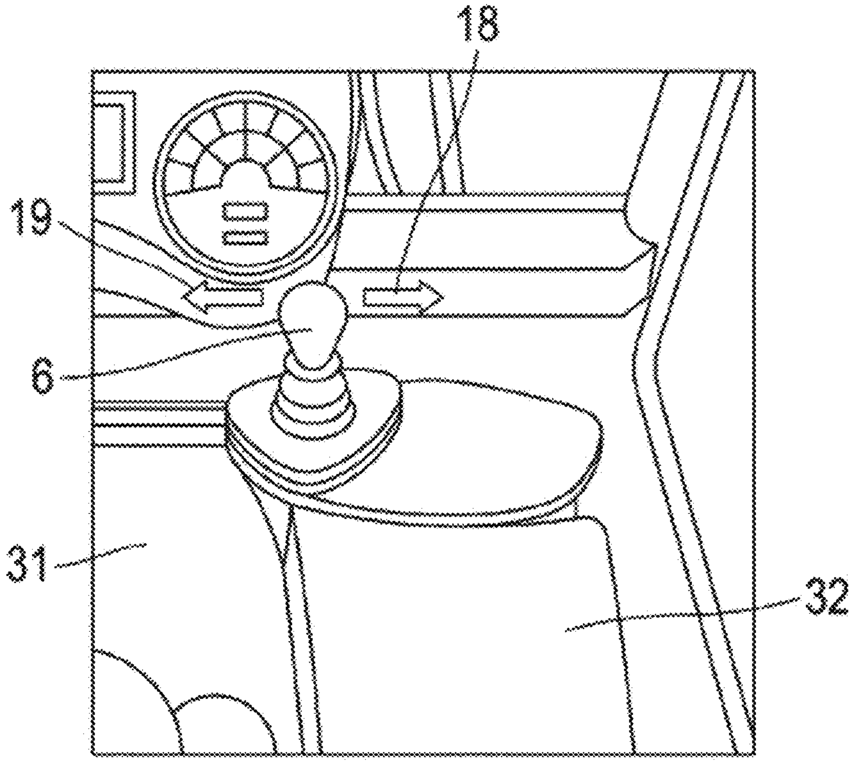
FIG. 2 is a perspective schematic view of a steering control joystick that can be used in the power lift truck of FIG. 1 according to an embodiment.

FIG. 2 represents the steering joystick 6. The steering joystick 6 is situated inside the driving cabin 3 and is composed of a handle disposed on a plinth, the handle being secured to the plinth. The handle is linked to the plinth by a ball joint link. The steering joystick 6 can be inclined in a transverse direction, the transverse direction being at right angles to a direction of the armchair arm. According to a preferred embodiment, inclining the joystick in the transverse direction makes it possible to control the turning movement of the wheels.

A direction of inclination of the steering joystick 6, namely to the right as illustrated by the arrow 18 or to the left as illustrated by the arrow 19, indicates a turning direction of the wheels. An angle of inclination of the steering joystick allows a quantitative control of the turning angle, via a processing of the position signal A generated by the steering joystick 6, as will be explained below.

Figure 3:
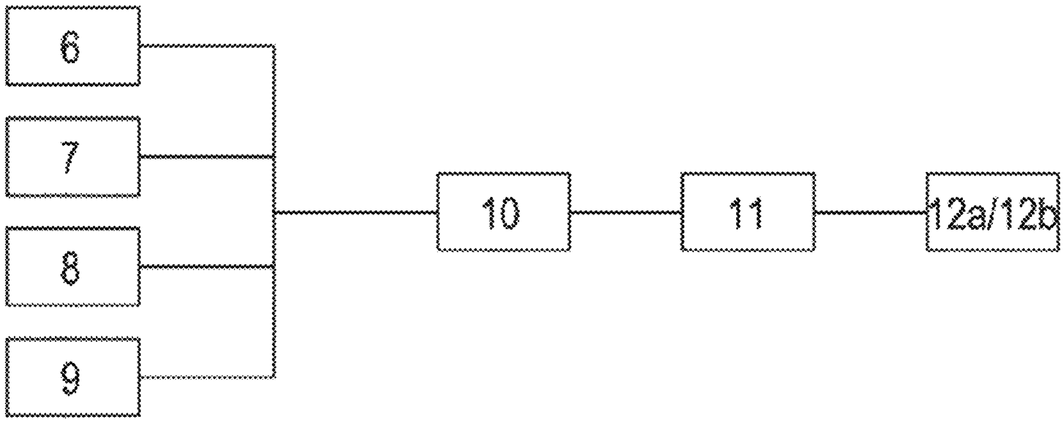
FIG. 3 is a functional schematic representation of a steering control system that can be used in the power lift truck of FIG. 1 by interaction with sensors, a steering control member and actuators according to an embodiment.

FIG. 3 represents a summary diagram of the elements that allow the turning movement and the interaction of said elements with one another according to an embodiment.

The steering joystick 6 makes it possible to generate a position signal A. The speed sensor 7 measures the speed of movement of the vehicle v. The elevation angle sensor 8 measures the lifting arm elevation angle x. A wheel angle sensor 9 measures an angular position of the wheels.

The position signal A, the speed of movement of the vehicle v, the elevation angle of the lifting arm x and the angular position of the wheels are processed by the steering control system 10, which generates a wheel position signal E, which is a new wheel position angle. Said wheel position signal E is transmitted to a hydraulic control valve system 11, then to a front actuator 12*a* and a rear actuator 12*b*, which control the turning movement of the wheels.

The wheel position signal E is calculated every 10 milliseconds and is transmitted to the hydraulic control valve system 11 every 20 milliseconds, which gives the operator an impression of immediacy, namely real-time control.

Figure 4:
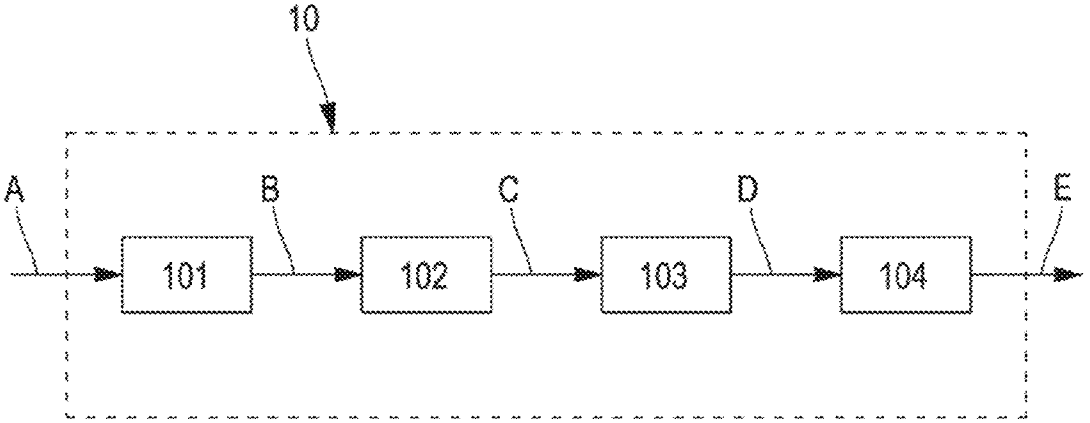
FIG. 4 is a functional schematic representation of different modules that can be used in the steering control system of FIG. 3 according to an embodiment.

FIG. 4 represents modules of which the control system 10 is composed and their interactions. A correction module 101 receives as input the position signal A and returns as output a corrected request signal B. A renormalization module 102 receives as input the corrected request signal B and returns as output a re-normalized request signal C. A filtering module 103 receives as input the re-normalized request signal C and returns as output a filtered turning request signal D. 104 is a conversion module, which takes as input a filtered turning request signal D and returns as output a wheel position signal E.

The correction module 101 comprises a gain function 51 which makes it possible to correct the position signal A.

The renormalization module 102 comprises a renormalization function 61 which returns a multiplying normalization coefficient value a dependent on the speed of movement of the vehicle V.

The filtering module 103 assesses a rate-of-variation cap of the turning angle as a function of the speed of movement v and of the elevation angle x of the lifting arm 4. The filtering module comprises a first filtering function 70-71 dependent on the lifting arm orientation parameter x and a second filtering function 72-73 dependent on the speed of movement v.

The conversion module 104 converts the filtered turning request signal D into the wheel position signal E and possibly applies a variable capping law to the wheel position signal E.

Figure 5:
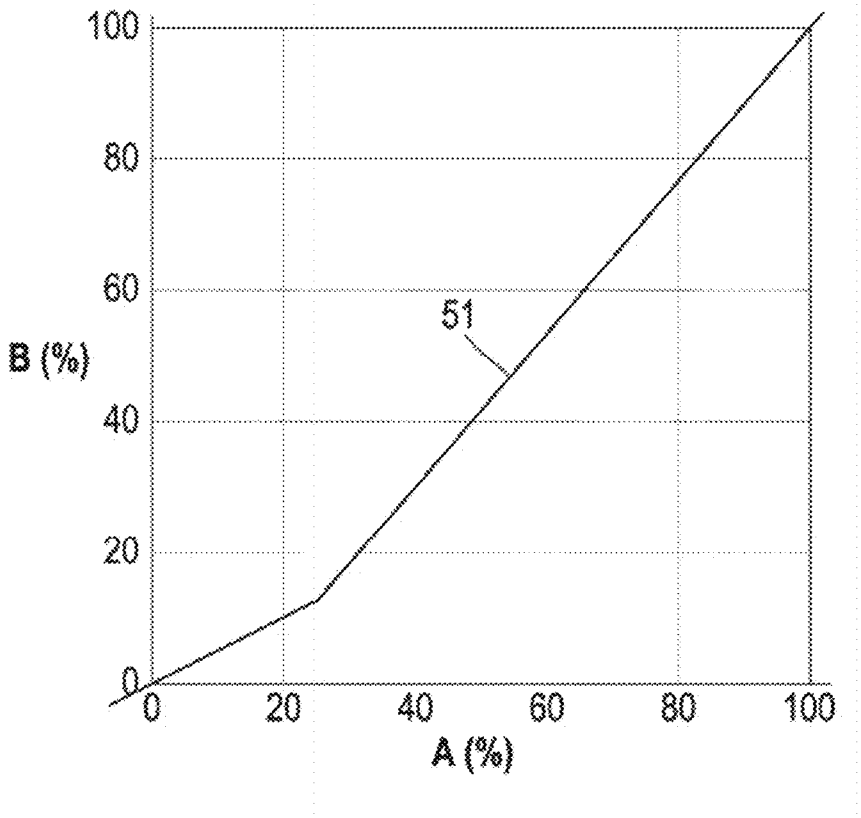
FIG. 5 is a graphic representation of a gain function according to an embodiment.

FIG. 5 represents the gain function 51 used in the correction module 101, according to an embodiment. FIG. 5 represents on the X axis the position signal A, expressed as a percentage. The value 0% means that the steering joystick 6 is vertical (reverse position by default) and therefore no turning request is produced by the operator. The value 100% means that the steering joystick 6 is leaning to the maximum to the right or to the left. The gain function 51 is the same for both right and left turn requests.

The gain function 51 is convex and less than the identity function. The gain function 51 allows a finer control of the movement of the wheels for the movements of the steering joystick 6 that are of low amplitude.

Figure 6:
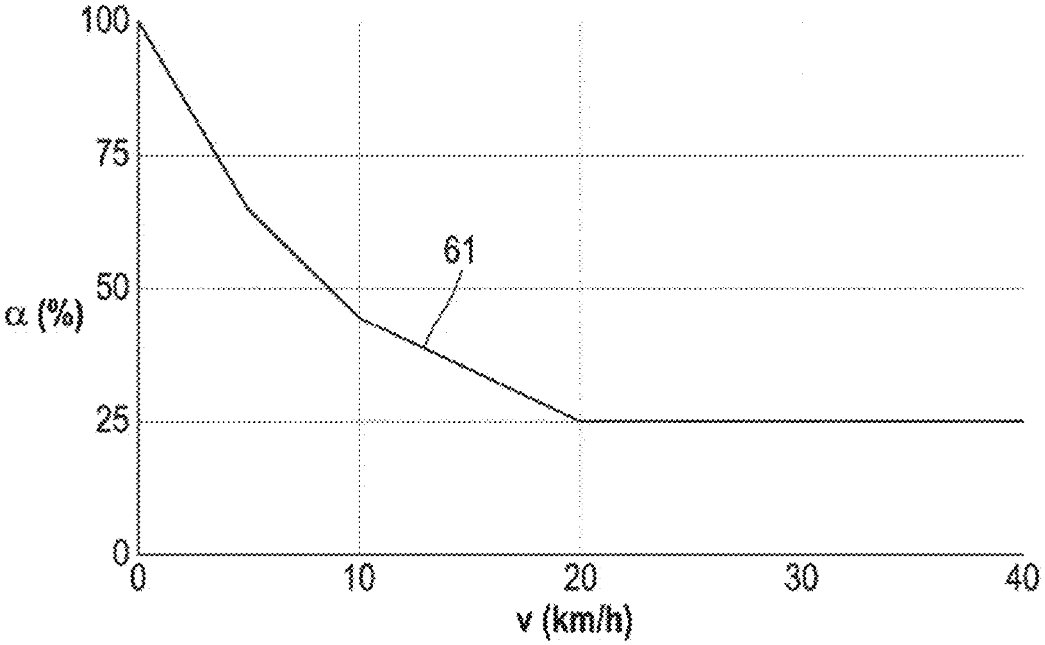
FIG. 6 is a graphic representation of a renormalization function according to an embodiment.

FIG. 6 represents the renormalization function 61 used in the renormalization module 102.

The renormalization function 61 takes as input a speed of movement of the vehicle v, represented on the X axis and expressed in km/h, and returns a multiplying renormalization coefficient α, adimensional and expressed as a percentage, which is subsequently applied to the corrected turning request signal B and which corresponds to an authorized maximum turning request as a function of the speed of movement of the vehicle.

The renormalization function 61 is a decreasing and positive function.

One effect of the renormalization function 61 is to increase a sensitivity of the steering joystick 6 over authorized angle ranges. Indeed, after application of the renormalization function 61, a maximum amplitude of the movement of the orientation control member 6 corresponds to a lower maximum turning request, which provokes an increase in sensitivity.

Figure 7:
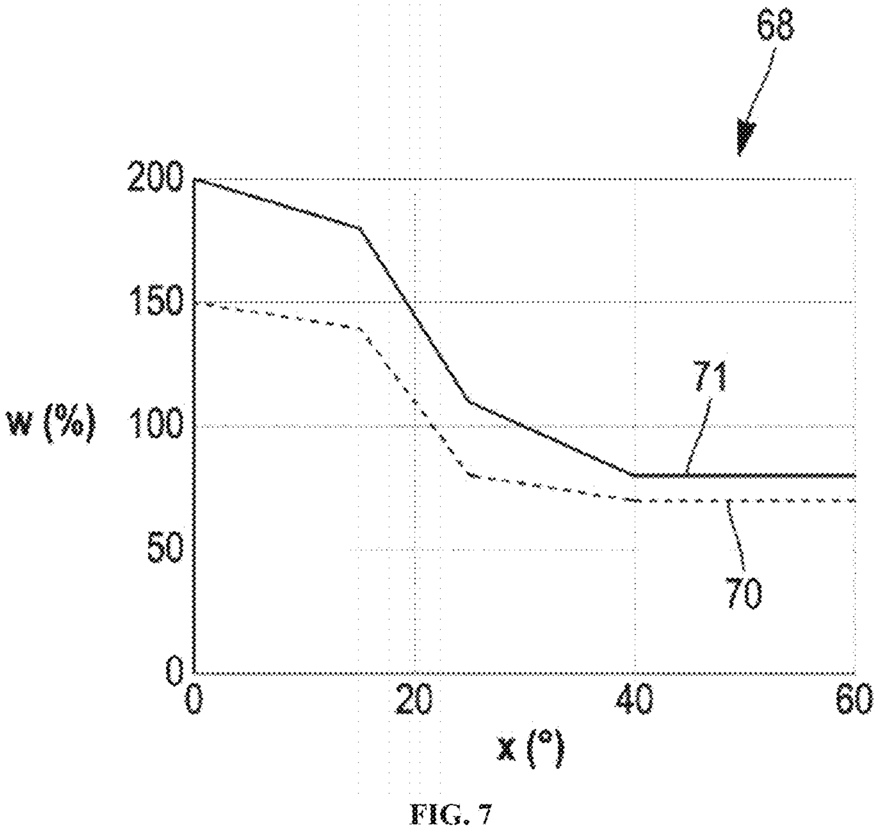
FIG. 7 is a graphic representation of a first filtering function according to an embodiment.

FIG. 7 represents a first filtering function 68 dependent on the lifting arm elevation angle. Said first filtering function is used in the filtering module 103. FIG. 7 represents on the X axis the elevation angle x of the lifting arm 4, expressed in degrees, and returns a first rate-of-variation cap w, expressed as a percentage.

The first filtering function is a low-pass filter. The first filtering function takes a first, constant level value after a threshold angle value is reached. The threshold angle value is 40° in the example represented.

The first filtering function 68 comprises a first turn cap value 70 if a direction of variation of the turning request signal is a turn direction and a first reverse cap value 71 if the direction of variation is a reverse direction. The first filtering function 68 returns a first speed cap.

The first reverse cap value 71 is higher than the first turn cap value 70, which has the effect of making it possible to straighten the direction of the vehicle more rapidly than the turning speed.

Figure 8:
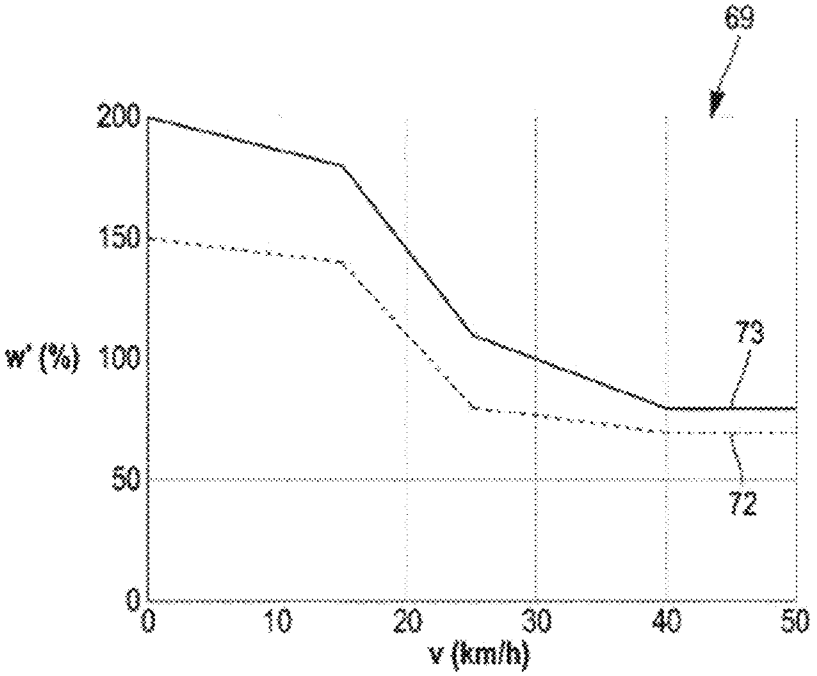
FIG. 8 is a graphic representation of a second filtering function according to an embodiment.

FIG. 8 represents a second filtering function 69 dependent on the speed of movement v. Said second filtering function 69 is used in the filtering module 103. FIG. 8 represents on the X axis the speed of movement v of the vehicle, expressed in km/h and returns a second rate-of-variation cap w', expressed as a percentage.

The second filtering function 69 is a low-pass filter. The second filtering function takes a second, constant level value after a threshold speed-of-movement value is reached. The level speed-of-movement value is 40 km/h in the example represented.

The second filtering function 69 comprises a second turn cap value 72 if the direction of variation of the turning request signal is the turn direction and a second reverse cap value 73 if the direction of variation is the reverse direction, the second reverse cap value 73 being greater than the second turn cap value 72. The second filtering function 69 returns a second speed cap.

The operation of the filtering module 103 will now be explained with reference to FIG. 9.

Figure 9:
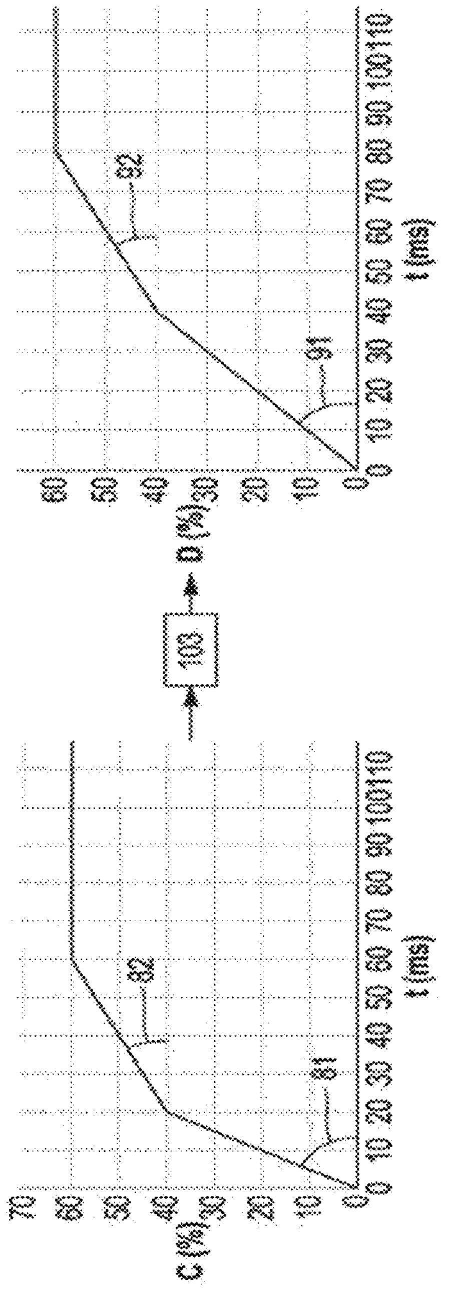
FIG. 9 is a graphic representation illustrating the operation of a filtering module according to an embodiment.

FIG. 9 represents, on the left, an example of re-normalized request signal C as a function of time and the corresponding filtered turning request signal D, after processing by the filtering module 103.

The re-normalized turning request signal C increases linearly with a first input slope 81 up to 20 milliseconds, then follows a second input slope 82 up to 60 milliseconds, then remains constant beyond. The second input slope 82 is less than the first slope 81.

The filtering module 103 applies the rate-of-variation caps represented in FIGS. 8 and 9 to produce the filtered turning request signal D. The rate-of-variation cap is a minimum value between the first speed cap, generated by the first filtering function, and the second speed cap, generated by the second filtering function. For example, if the rate-of-variation cap is equal to 10% then the first input slope 81 is greater than the rate-of-variation cap and the second input slope 82 is less than the rate-of-variation cap.

Every 20 milliseconds, the filtering module 103 transmits a new filtered turning request signal D. Up to 40 milliseconds, the filtered turning request signal D follows a first output slope 91 which is equal to the rate-of-variation cap. Beyond that, the filtered turning request signal D follows a second output slope 92 which is equal to the second input slope 82.

The operation of the conversion module 104 will now be explained with reference to FIGS. 10 and 11.

Figure 10:
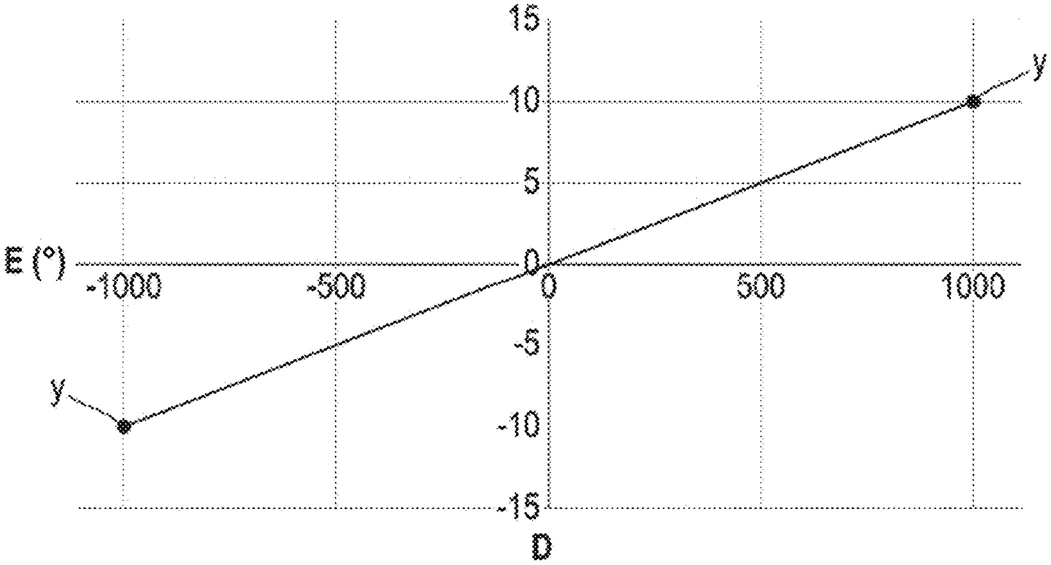
FIG. 10 is a graphic representation of a conversion function converting a turning request signal into a wheel position signal, according to an embodiment.

FIG. 10 represents a conversion function between the filtered turning request signal D and the wheel position signal E. FIG. 10 represents on the X axis the filtered turning request signal D, adimensional, and returns the wheel position signal E, expressed in degrees. The filtered turning request signal D takes algebraic values, negative values corresponding to a request for displacement to the left and positive values corresponding to a request for displacement to the right. By convention, the filtered turning request signal D takes values between −1000 and +1000. The conversion function is linear and takes positive and negative angle values. The negative angle values correspond to a turn to the left, the positive angle values correspond to a turn to the right.

In this embodiment, the conversion module 104 implements a capping function that is variable as a function of the speed. Indeed, a maximum turning angle value y depends on the speed of movement of the vehicle. The maximum turning angle value y is determined by application of a capping law represented in FIG. 11.

Figure 11:
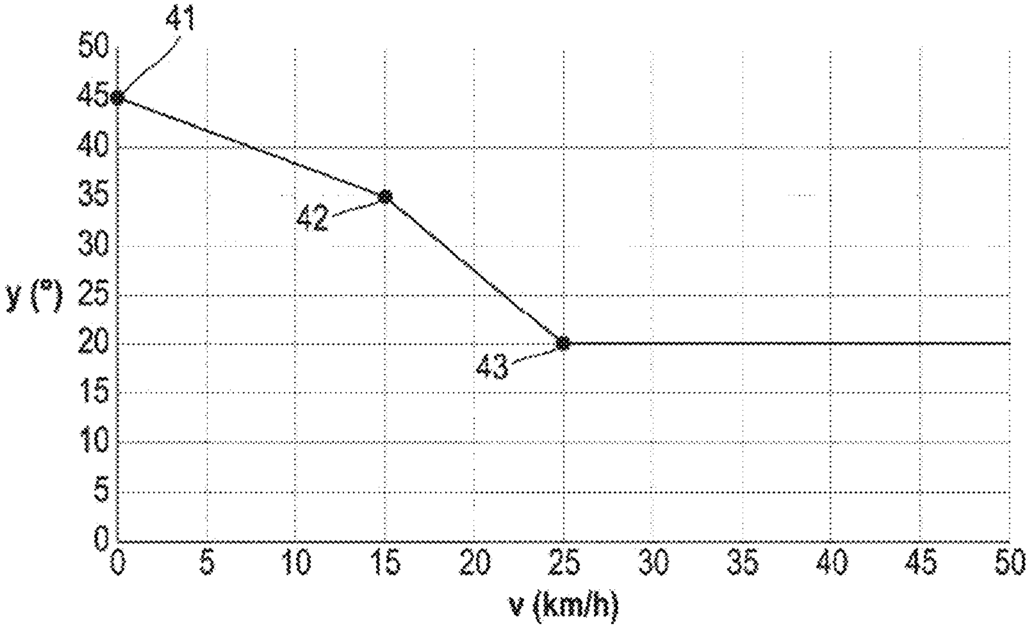
FIG. 11 is a graphic representation of a capping law that can be implemented in the conversion function of FIG. 10.

FIG. 11 represents the wheel angle capping law as a function of the speed of movement of the vehicle. FIG. 11 represents on the X axis the filtered turning request signal D and returns the wheel position signal E. Thresholds 41, 42 and 43 correspond to a vehicle speed-of-movement value beyond which a slope of the capping law is modified. The capping law is a decreasing law, piecewise affine, and constant after a third threshold 43.

As a variant, the conversion function implemented by the conversion module 104 could be independent of the speed of movement, namely the capping law of FIG. 11 could be a constant function.

As a variant, the lifting arm 4 may not be telescopic.

As a variant, there can be two turning actuators, a first actuator 12*a* being coupled to the front wheels 5*a* and a second actuator 12*b* being coupled to the rear wheels 5*b*.

As a variant, the gain function 51 can be piecewise affine, polynomial, exponential, etc.

As a variant, the renormalization function 61 can be affine, piecewise affine, polynomial, exponentially decreasing, etc.

As a variant, the control system 10 can also comprise fewer turning request signal processing functions and/or other functions. For example, one or more modules out of the correction module 101 and the renormalization module 102 could be eliminated. The second filtering function 72-73 of the filtering module 103 could be eliminated. Some modules of the control system could be placed in an order other than that represented.

Preferably, the control system 10 comprises a user interface (not represented) which makes it possible to configure the values of the parameters that influence the processing of the turning request signal, namely for example:

the values of the gain function 51 implemented by the correction module 101, the values of the renormalization function 61 implemented by the renormalization module 102, the values of the first and second filtering functions implemented by the filtering module 103, the values of the capping law implemented by the conversion module 104.

The steering control system described above is used mainly to secure the use of the rolling work vehicle when handling operations are in progress. The fact that another steering control system could be used in other conditions, for example when the work vehicle is travelling on the road network, if such travelling is permitted, is not excluded.

A load handling truck with telescopic arm has been described, but the turning control system can be applied to another rolling work vehicle having a lifting arm, for example a rotary turret handling truck, a bucket loading machine or the like.

As a variant, in addition to or instead of the lifting arm elevation angle sensor, other lifting arm orientation parameters can be measured and taken into account by the turning control system, for example an orientation angle of the arm in an azimuthal direction with respect to the longitudinal direction of the vehicle.

Some of the elements represented, notably the control system 10, can be produced in different forms, unitary or distributed, by means of hardware and/or software components. Hardware components that can be used are specific integrated circuits ASIC, programmable logic arrays FPGA or microprocessors. Software components can be written in different programming languages, for example C, C++, Java or VHDL. This list is not exhaustive.

Although the disclosure has been described linked to a number of particular embodiments, it is quite obvious that it is in no way limited thereto and that it encompasses all the technical equivalents of the means thus described and the combinations thereof if the latter fall within the context of the disclosure.

The use of the verb "comprise" or "include" and its conjugate forms does not preclude the presence of elements or steps other than those stated in a claim.

In the claims, any reference symbol between parentheses should not be interpreted as a limitation of the claim.

The invention claimed is:

1. A work vehicle comprising:

a main body;

a lifting arm mounted to be movable on the main body;

a sensor configured to detect an orientation parameter of the lifting arm;

a steering axle including at least two steering wheels;

a turning actuator coupled to the steering wheels to modify a turning angle of the steering wheels;

a steering control member actuatable by an operator to produce a turning request signal; and a steering control system configured to receive the turning request signal and the orientation parameter to generate a filtered turning request signal representative of the turning angle of the steering wheels to drive the turning actuator, wherein the steering control system includes a filtering module configured to:

determine a direction of variation of the turning request signal based on a turn direction and a reverse direction, determine a first rate-of-variation cap based on the orientation parameter, the first rate-of-variation cap being determined as a first cap value when the direction of variation is the turn direction in which the turning angle is increased, and as a second cap value when the direction of variation is the reverse direction in which the turning angle is reduced, the second cap value being higher than the first cap value, and generate the filtered turning request signal based on the turning request signal such that a rate of variation of the filtered turning request signal does not exceed the first rate-of-variation cap.

2. The work vehicle of claim 1, wherein the orientation parameter includes a lifting arm angle.

3. The work vehicle of claim 2, wherein the lifting arm angle is an elevation angle about a horizontal axis.

4. The work vehicle of claim 3, wherein the first rate-of-variation cap decreases when the elevation angle of the lifting arm increases.

5. The work vehicle of claim 1, wherein the filtering module is configured to:

determine a minimum rate of variation based on a rate of variation of the turning request signal and the first rate-of-variation cap, and generate the filtered turning request signal such that the rate of variation of the filtered turning request signal corresponds to the minimum rate of variation.

6. The work vehicle of claim 1, further comprising a sensor for detecting a speed of movement of the work vehicle and wherein the filtering module is further configured to:

determine a second rate-of-variation cap based on the speed of movement of the work vehicle, and generate the filtered turning request signal based on the turning request signal such that the rate of variation of the filtered turning request signal does not exceed the second rate-of-variation cap.

7. The work vehicle of claim 6, wherein the second rate-of-variation cap decreases when the speed of movement increases.

8. The work vehicle of claim 6, wherein the filtering module is further configured to:

determine the second rate-of-variation cap as a third cap value when the direction of variation is the turn direction, and as a fourth cap value when the direction of variation is the reverse direction, the fourth cap value being higher than the third cap value.

9. The vehicle of claim 6, wherein the filtering module is configured to:

determine a minimum rate of variation based on the rate of variation of the turning request signal, the first rate-of-variation cap and the second rate-of-variation cap, and generate the filtered turning request signal such that the rate of variation of the filtered turning request signal corresponds to the minimum rate of variation.

10. The work vehicle of claim 1, further comprising a sensor for detecting a speed of movement of the work vehicle, wherein the steering control system includes a renormalization module configured to:

receive the turning request signal from the steering control member, determine a multiplying renormalization coefficient based on the speed of movement of the work vehicle, generate a re-normalized turning request signal based on the turning request signal and the multiplying renormalization coefficient, and supply the re-normalized turning request signal to the filtering module.

11. The work vehicle of claim 10, wherein the multiplying renormalization coefficient decreases when the speed of movement increases.

12. The work vehicle of claim 1, wherein the steering control system includes a correction module configured to:

receive the turning request signal from the steering control member, and generate a corrected turning request signal by application of a gain function to the turning request signal, the gain function being a convex function.

13. The work vehicle of claim 1, further comprising a sensor for detecting a speed of movement of the work vehicle, wherein the steering control system includes a conversion module configured to:

determine a turning angle cap based on the speed of movement of the work vehicle, wherein the turning angle cap decreases when the speed of movement increases, and generate the filtered turning request signal by application of a capping law to the turning request signal, such that the filtered turning request signal represents a turning angle value less than or equal to the turning angle cap.

14. The work vehicle of claim 1, wherein the steering control member is a steering joystick that can be actuated by a hand or by a finger of the operator.

15. The work vehicle of claim 1, further comprising two steering axles including at least four steering wheels, wherein the turning actuator is coupled to the four steering wheels to modify the turning angle of the four steering wheels.

16. A control method for controlling a turning actuator in a work vehicle, the work vehicle including a main body, a lifting arm mounted to be movable on the main body, and a steering axle including at least two steering wheels, the turning actuator being coupled to the steering wheels to modify a turning angle of the steering wheels, the method comprising:

receiving a turning request signal from a steering control member that can be actuated by an operator;

receiving an orientation parameter of the lifting arm;

determining a direction of variation of the turning request signal based on a turn direction and a reverse direction;

determining a first rate-of-variation cap based on the orientation parameter of the lifting arm, the first rate-of-variation cap being determined as a first cap value when the direction of variation is the turn direction in which the turning angle is increased and as a second cap value when the direction of variation is the reverse direction in which the turning angle is decreased, the second cap value being higher than the first cap value;

generating a filtered turning request signal representative of the turning angle of the steering wheels based on as a function of the turning request signal such that a rate of variation of the filtered turning request signal does not exceed the first rate-of-variation cap; and driving the turning actuator based on filtered turning request signal.

17. A work vehicle comprising:

a sensor configured to detect an orientation parameter of a lifting arm;

a turning actuator configured to modify a turning angle of a steering wheel;

a steering control member configured to produce a turning request signal; and a steering control system configured to generate a filtered turning request signal representative of the turning angle to drive the turning actuator, the steering control system including a filtering module configured to determine a first rate-of-variation cap based on the orientation parameter, the first rate-of-variation cap being determined as a first cap value when the turning angle increases, and as a second cap value when the turning angle reduces, the second cap value being greater than the first cap value, and generate the filtered turning request signal based on the turning request signal such that a rate of variation of the filtered turning request signal is less than or equal to the first rate-of-variation cap.

18. The work vehicle of claim 17, wherein the steering control system further includes a conversion module configured to generate a wheel position signal based on the filtered turning request signal.

19. The work vehicle of claim 18, wherein the turning actuator is driven based on the wheel position signal.

20. The work vehicle of claim 18, wherein the conversion module uses a linear conversion function to generate the wheel position signal.

* * * * *